United States Patent Office 3,112,088
Patented Nov. 26, 1963

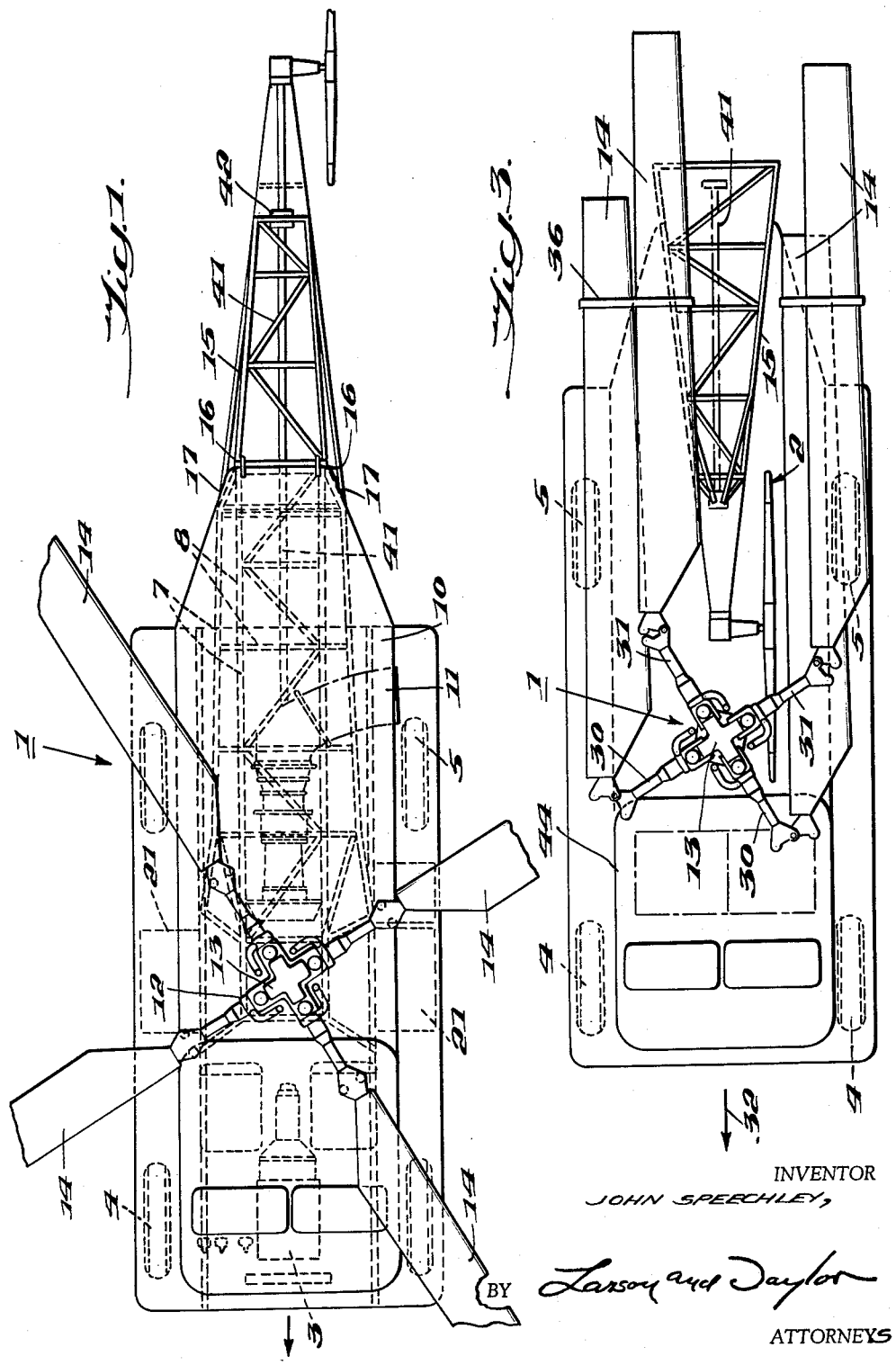

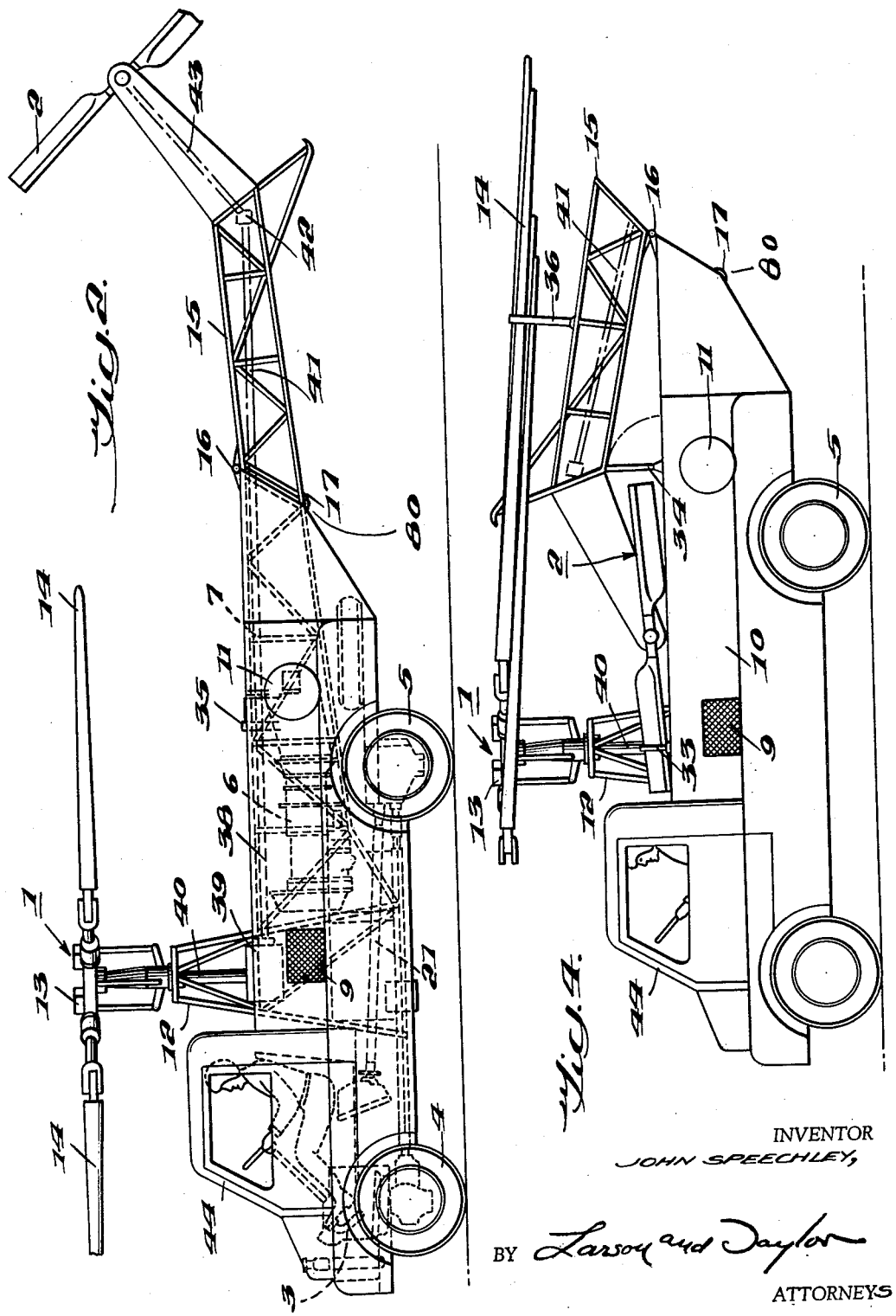

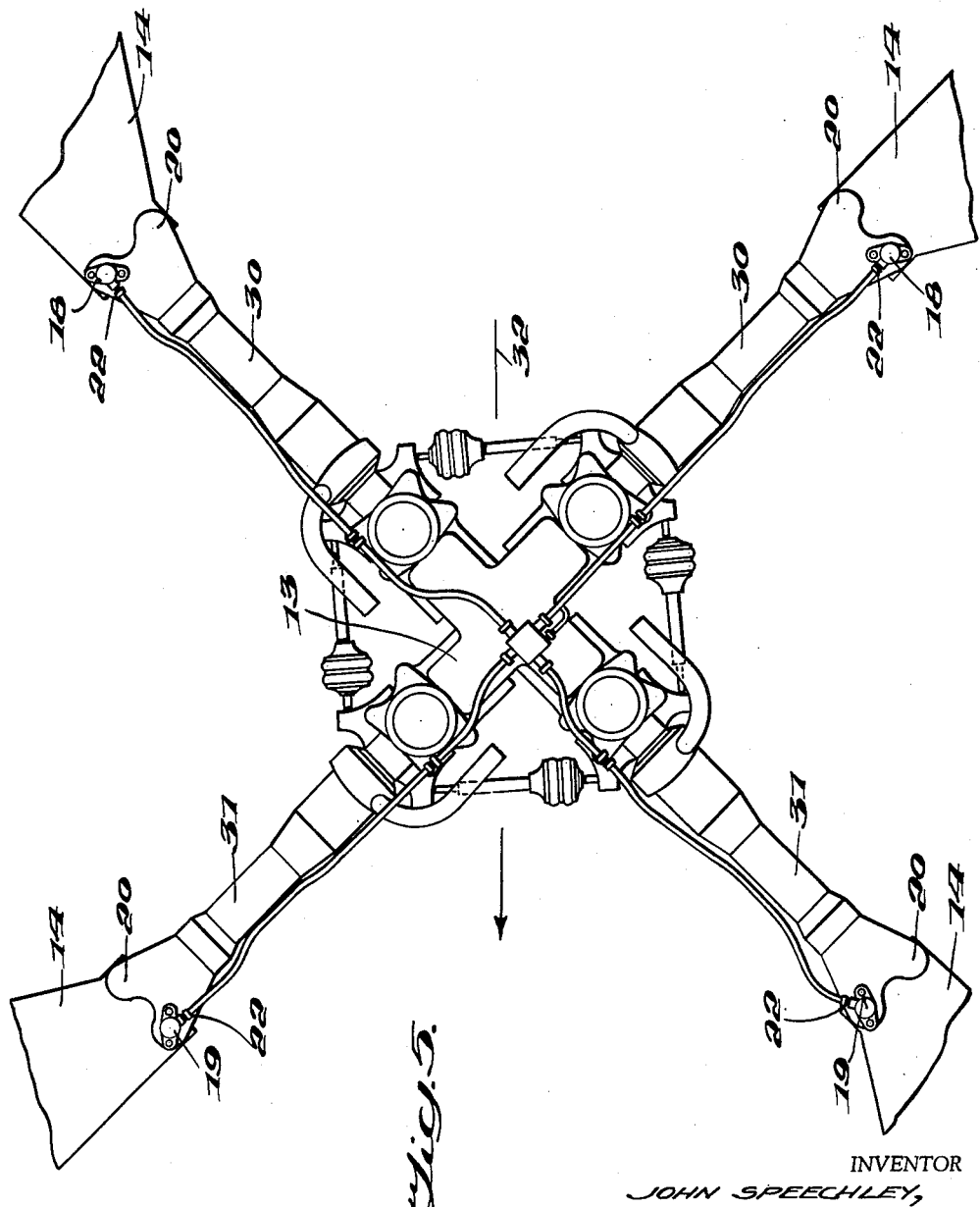

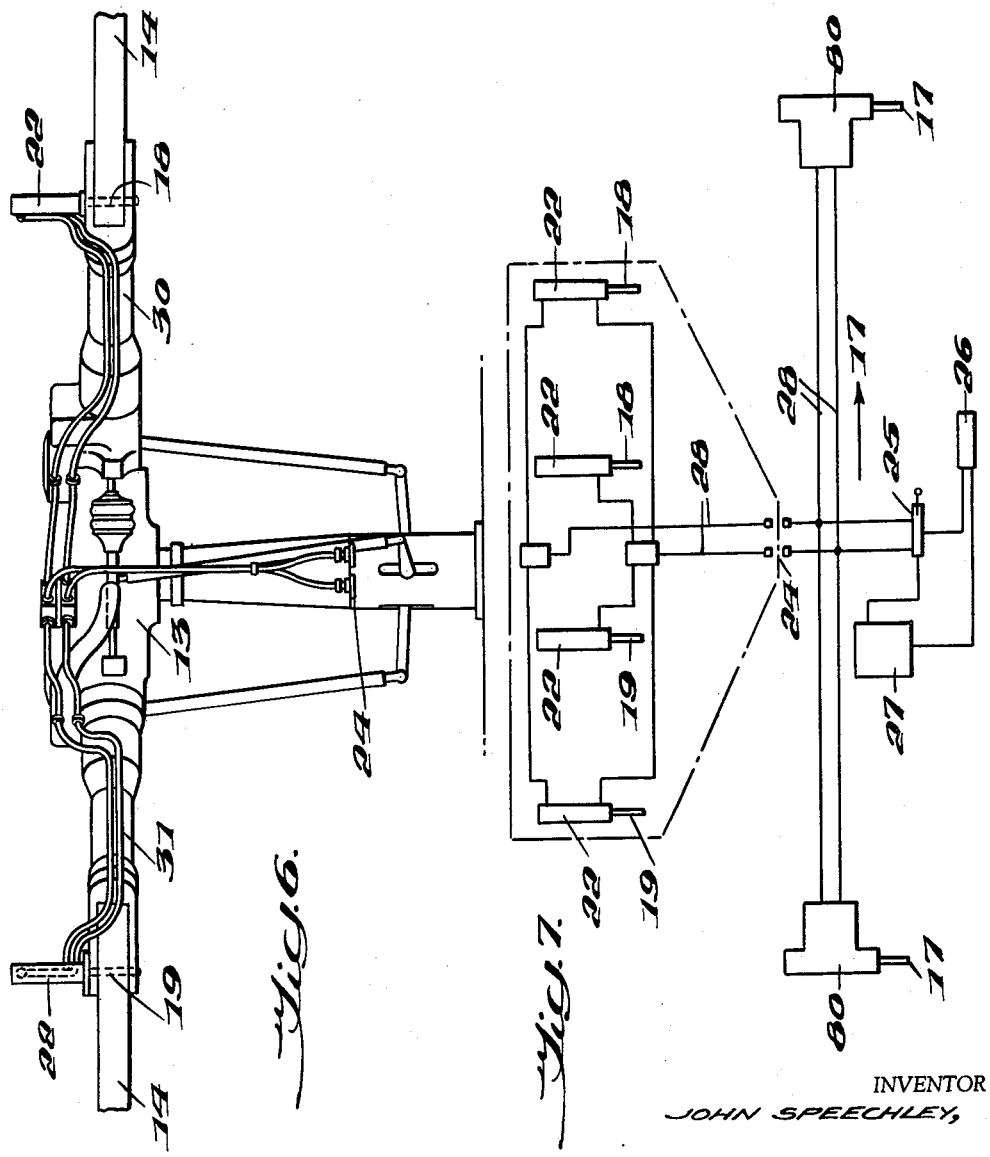

3,112,088
FLYING VEHICLES
John Speechley, Yeovil, England, assignor to Westland Aircraft Limited, Yeovil, England
Filed July 31, 1961, Ser. No. 128,028
Claims priority, application Great Britain Aug. 6, 1960
7 Claims. (Cl. 244—2)

This invention relates to land vehicles of the kind which are constructed to travel across country over unprepared ground in addition to being usable in the normal manner on roads and in traffic conditions and being adapted to become airborne when desired. Such vehicles have many military applications, and may be used for expeditions, exploration and survey missions.

One object of this invention is to provide a land vehicle having flight capability, said vehicle comprising known and available components which are assembled to form a novel combination which achieves, in an economical and practical manner, results not so far obtained.

The invention broadly consists of a land vehicle capable of flight over obstacles such as hedges, ditches and rivers, said vehicle comprising the combination of a land vehicle, a stowable lifting rotor, means for counteracting torque set up by said rotor, engine means for flight power separate from engine means for ground travel, and control means for flight. More particularly, the invention consists of a land vehicle capable of forward flight with vertical take-off and landing, said vehicle consisting of the combination of a chassis or integral body-chassis, ground wheels, engine, transmission and controls of a land vehicle, and suspension for said wheels, said chassis or body-chassis supporting lift and tail torque-compensating rotors, said rotors being movable from flight positions into stowed positions wherein said rotors lie close to or within the plan area between the sides of said vehicle, and an aircraft power plant, for driving said rotors for flight, means for operating said rotors from said power plant and means for controlling said power plant and rotors for flight. The invention also consists in a vehicle wherein said lift rotor blades are pivotally connected by their roots to the head of said rotor and are foldable from said flight position to lie in said stowed position with their axes substantially parallel to the fore-and-aft axis of said vehicle, said tail rotor being carried by means foldable from an astern flight position forwards on to said vehicle into said stowed position wherein said rotor carrier forms a stowage anchorage or support for the folded blades of said lift rotor. In this way, the unfolded or flight diameter of the lift rotor can be large enough to give the best possible lift/power performance without detriment to operation of the vehicle in the ground role, whilst the tail rotor in the flight position is extended sufficiently astern of the vehicle to ensure good control and stability. When the vehicle is to be driven along a road or over the ground, the particular arrangement described eliminates the need for loose parts and provides compact flight arrangements. To reduce the time and labour required in converting the vehicle from ground to flight role and vice versa, hydraulic means are provided to lock said rotors in the flight position and to unlock them from this position, said hydraulic means being operable to effect simultaneous locking or unlocking of both rotors. This can be arranged conveniently for operation by the driver in the driving cabin. When gas turbine engines are used as the power plant the bearings of aircraft gas turbine engines may be susceptible to damage when stationary, due to vibration when the vehicle is driven along the ground. The invention also consists in providing means for disconnecting said turbine from said rotor driving shafts and for rotating said turbine whilst said vehicle is being driven in the ground role. The road-wheel suspension is preferably the normal suspension provided for vehicles designed to travel along roads or over rough ground, but this may be reinforced by the provision of aircraft type oleo legs to absorb the extra loads imposed by heavy landings.

One form of vehicle in which the invention is carried into effect will now be described, by way of example only, with reference to the accompanying drawings in which:

FIGURES 1 and 2 are respectively plan and side elevations of a vehicle with rotors in the flight position, the main rotor blade tips being broken away, and certain internal components of the vehicle indicated by broken lines, whilst:

FIGURES 3 and 4 are respectively similar drawings, showing the rotors folded and the vehicle ready for operation on the ground, the internal components not being shown, and FIGURES 5 and 6 are respectively plan and side elevations of the main rotor head, showing hydraulic means for releasing the blades for folding and stowage;

FIGURE 7 is a diagram of a hydraulic system for unlocking main and tail rotors for stowage and;

FIGURE 8 is a general arrangement of the driving cabin, flight instruments and flight controls.

The drawings illustrate a vehicle which has a wheel base in the order of 10 feet, a track of about 6 feet and an overall length, with rotors 1 and 2 stowed as shown in FIGURES 3 and 4 of about 23 feet. The all-up operating weight is in the neighbourhood of 7,000 lbs. of which some 3,000 lbs. is made up of flight components and flight fuel. An engine 3 (FIGURES 1 and 2) for ground operation is petrol driven, and develops about 100 brake horsepower for driving pairs of road wheels 4 and 5, whilst an aircraft gas turbine engine 6 (FIGURES 1 and 2) develops approximately 1,400 shaft horsepower for driving the lift rotor 1 and tail rotor 2. The diameter of the lift rotor 1 is between 30 and 35 feet, whilst the tail rotor 2 has a diameter in the order of 7 feet. This arrangement, at the initial all-up weight, is estimated to enable the vehicle to take-off and hover 15 feet above ground 3,000 feet above sea-level in the extreme atmospheric temperatures of 34 degrees centigrade, corresponding to an atmospheric temperature of 104 degrees Fahrenheit at sea level.

It is unnecessary to described the ground operation components in detail, since these are of well known and conventional design, except to say that the vehicle has two or four wheel drive, and that the road wheel suspension is reinforced by the addition of long-stroke aircraft oleo legs, not shown, to absorb heavy landing loads. The description will therefore be confined to the flight components and their operation.

Referring particularly to FIGURES 1 and 2, the gas turbine engine 6 is suspended within a main flight-component structure 7 composed of an assembly of tubular members 8. Engine removal is effected through the top of the structure 7, appropriate members 8 being removable for this purpose. The engine 6 is co-axially located with the fore-and-aft centre line of the vehicle, whilst intake air is provided through port and starboard mesh grilles 9 in side fairing 10, no intake ducts being necessary. The exhaust efflux is discharged through the port side of the fairing 10 via a removable jet pipe 11. Fuel for the engine 6 is carried in side tanks 21 ,FIGURE 1, positioned near to the centre of gravity since this eliminates any major trim changes during flight. Fuel transfer between the tanks 21 is effected by electric pumps which are not shown. Electrical flight starting of the engine 6 is provided and, in order to avoid damage to the turbine bearings when the vehicle is being used in the ground role, an electric motor, not shown, rotates the turbine to counteract vibration of the vehicle.

The lift rotor 1, consisting of four blades 14 and a rotor head 13, is mounted on a pylon 12 forming part of the structure 7. As shown in detail in FIGURES 5 and 6, the roots of the rotor blades 14 are secured to the arms 30 and 31 of the rotor head 13 by pivot pins 20, and releasable pins 18 and 19 formed as parts of hydraulic jacks 22 by which these pins 18 and 19 are withdrawn or engaged in complementary holes formed in the roots of the blades 14. When the pins 18 and 19 are withdrawn from the holes in the blades 14, the blades can be folded manually for stowage as shown in FIGURES 3 and 4.

Referring to FIGURES 1 and 2, the tail torque-compensating rotor 2 is mounted on a boom 15 which is hinged at 16 and secured by releasable pins 17, to the rear of the vehicle. The pins 17 form parts of hydraulic jacks 80 carried by the rear of the vehicle. The arrangement of pins 17 and jacks 80 is additionally shown in FIGURE 7. Operation of the hydraulic jacks engages or withdraws the pins 17 from complementary holes in the tail boom 15. When the pins are withdrawn, the boom can be folded manually about the hinges 16 to stow the rotor 2 on the vehicle, as shown in FIGURES 3 and 4.

The hydraulic jacks 22 and 80 are coupled to operate in parallel, as shown in FIGURE 7, by a flexible pipe system 28 through detachable service couplings 24 (FIGURES 6 and 7) to a selector valve 25 and hand pump 26. The selector valve and hand pump are conveniently located in the driving cabin, and their operation causes all the pins 18, 19 and 17 to be engaged or withdrawn simultaneously to lock or unlock the blades 14 and boom 15 for flight or stowage respectively. The system is provided with an oil reservoir 27.

To convert the vehicle from the air role to the ground role, the main rotor 1 is brought to the diagonal position shown in FIGURE 5 where the rotor arms 31 are leading and lie on either side of the vehicles fore-and-aft axis 32. In this position the rotor arms 30 are positioned similarly but to the rear. The selector valve 25 is set for pin withdrawal and the pump 26 operated to unlock the rotor blades 14 and tail boom 15. Referring to FIGURE 4 the boom 15 complete with rotor 2 is then folded manually into the stowed position shown and secured by support struts 34 and a quick release clamp 33. The rotor blades 14 are next folded manually and secured by quick release straps 36 attached to the boom 15. The procedure for reverting back from road to flight role is the reverse of that stated above, and the time required for conversion to either role is in the order of two minutes.

Referring now to FIGURE 2, the jet turbine engine 6 drives the main rotor 1 via a clutch and gearbox 35, a shaft 38, main gearbox 39, and vertical shaft 40. A separate shaft 41 from the gearbox 35 drives the tail rotor 2 via a gearbox 42 and shaft 43. To permit stowage of the tail boom 15, the shaft 41 incorporates a separable coupling, not shown, adjacent to the hinges 16 and comprising driving and driven members which are mated when the boom 15 is secured in the flight position. The main and tail rotor shafts 38 and 41 are interconnected by gearing in the gearbox 35 in such a way that upon engine failure the rotor 1, by auto-rotation, continues to rotate the rotor 2 to provide stability and control.

The vehicle has a driving cabin 44 the interior of which is shown in FIGURE 8. As viewed, the right hand side of the cabin incorporates the conventional controls for driving the vehicle along the ground. The selector valve 25 and hand pump 26, although not shown, are conveniently located here for operation by the driver upon bringing the vehicle to a halt prior to conversion to the flight role. The left hand side of the cabin incorporates the flying controls of a helicopter, and these comprise a cyclic pitch control column 45, collective pitch lever 46, and tail-rotor pitch control pedals 47 for directional control. To simplify the pilot's task, a rotor governor, not shown, may be fitted and have means for preselecting any desired rotor speed. Separate panels 48 and 49 are provided for flight and road instruments respectively. The flight panel 48 includes a compass 50, air speed indicator 51, rotor tachometer 52, torque meter 53, engine tachometer 54, jet pipe temperature gauge 55, oil temperature and pressure gauges 56, fuel contents gauge 57, fire warning indicator 58, generator failure warning indicator 59, and the usual switches. Each seat is fitted with a safety harness 60, and the cabin is provided with a wide windscreen, side and rear windows to enable good all round vision.

In a further embodiment tip jet turbine engines mounted on the rotor blade tips may be incorporated so that full button-on capability may be achieved.

In a further embodiment ram and pulse jet drive for the rotors may be used.

I claim as my invention:

1. A land vehicle capable of forward flight with vertical takeoff and landing, comprising a chassis provided with a plurality of road wheels and carrying a first power plant driving said road wheels by way of vehicle transmission means, a lift rotor assembly comprising a rotor head carried by a pylon secured to said chassis and a plurality of rotor blades attached to said rotor head in a pivotal manner at the root ends thereof, a torque compensating rotor mounted on a boom secured to the rear of said chassis, said boom being secured in a manner hingeable to the rear of said chassis, said rotor blades and said boom carrying said torque compensating rotor adapted to be movable from flight positions into stowed positions wherein said rotors lie close to and within the plan area defined by the sides of said chassis of said vehicle.

2. A land vehicle capable of forward flight with vertical takeoff and landing, comprising a chassis provided with a plurality of road wheels and carrying a first power plant driving said road wheels by way of vehicle transmission means, a lift rotor assembly comprising a rotor head carried by a pylon secured to said chassis and a plurality of rotor blades attached to said rotor head in a pivotal manner at the root ends thereof, a torque compensating rotor mounted on a boom secured to the rear of said chassis, said boom being secured in a manner hingeable to the rear of said chassis, said rotor blades and said boom carrying said torque compensating rotor adapted to be movable from flight positions into stowed positions wherein said rotors lie close to and within the plan area defined by the sides of said chassis of said vehicle, and further including a second power plant mounted on said chassis and having associated therewith means for transmitting power to said rotor head and said torque compensating rotor.

3. A land vehicle capable of forward flight with vertical takeoff and landing as claimed in claim 2, wherein said power transmitting means comprise a first gearbox and clutch assembly, a first shaft transmitting power from said first gearbox and clutch assembly to said rotor head by way of a second gear box and a second shaft, a third shaft simultaneously transmitting power from said first gear box and clutch assembly to said torque compensating rotor by way of a third gear box and a further shaft.

4. A land vehicle capable of forward flight with vertical takeoff and landing, comprising a chassis provided with a plurality of road wheels and carrying a first power plant driving said road wheels by way of vehicle transmission means, a lift rotor assembly comprising a rotor head carried by a pylon secured to said chassis and a plurality of rotor blades attached to said rotor head in a pivotal manner at the root ends thereof, a torque compensating rotor mounted on a boom secured to the rear of said chassis, said boom being secured in a manner hingeable to the rear of said chassis, said rotor blades and said boom carrying said torque compensating rotor adapted to be movable from flight positions into stowed positions wherein said rotors lie close to and within the plan area defined by the sides of said chassis of said vehicle, wherein said rotor blades attached to said rotor head in a pivoted manner are foldable from said flight position to lie in said stowed position with their axes substantially parallel to the fore and aft axes of said vehicle.

5. A land vehicle capable of forward flight with vertical takeoff and landing, comprising a chassis provided with a plurality of road wheels and carrying a first power plant driving said road wheels by way of vehicle transmission means, a lift rotor assembly comprising a rotor head carried by a pylon secured to said chassis and a plurality of rotor blades attached to said rotor head in a pivotal manner at the root ends thereof, a torque compensating rotor mounted on a boom secured to the rear of said chassis, said boom being secured in a manner hingeable to the rear of said chassis, said rotor blades and said boom carrying said torque compensating rotor adapted to be movable from flight positions into stowed positions wherein said rotors lie close to and within the plan area defined by the sides of said chassis of said vehicle, wherein said rotor blades attached to said rotor head in a pivoted manner are foldable from said flight position to lie in said stowed position with their axes substantially parallel to the fore and aft axes of said vehicle and said boom carrying said torque compensating rotor hingeable at the rear of said chassis is adapted to be manually folded from an astern flight position and secured in the stowed position disposed forward at the rear of said chassis by way of support struts and a quick release clamp such that said boom forms means for support of said rotor blades when in the stowed position, said blades being secured in the supported position by way of quick release straps.

6. A land vehicle capable of forward flight with vertical takeoff and landing, comprising a chassis provided with a plurality of road wheels and carrying a first power plant driving said road wheels by way of vehicle transmission means, a lift rotor assembly comprising a rotor head carried by a pylon secured to said chassis and a plurality of rotor blades attached to said rotor head in a pivotal manner at the root ends thereof, a torque compensating rotor mounted on a boom secured to the rear of said chassis, said boom being secured in a manner hingeable to the rear of said chassis, said rotor blades and said boom carrying said torque compensating rotor adapted to be movable from flight positions into stowed positions wherein said rotors lie close to and within the plan area defined by the sides of said chassis of said vehicle, each of said rotor blades being attached to corresponding arms of said rotor head and secured thereto in said pivotal manner by way of a pivot pin and a releasable pin, each of said pins being adapted to engage corresponding holes formed at the ends of said arms and at the roots of said rotor blades respectively, said boom carrying said torque compensating rotor secured to the rear of said chassis by way of a pivot pin and a releasable pin, each of said pins being adapted to engage corresponding holes formed at the end of said boom adjacent the rear of said vehicle and the end of said vehicle respectively; each releasable pin formed as part of a corresponding hydraulic jack, each hydraulic jack being operatively connected to a hydraulic pump by way of a selector valve, such that operation of said pump actuates said jacks to effect simultaneous withdrawal or replacement of said releasable pins thereby effecting simultaneous unlocking or locking of said rotor and said tail boom.

7. A land vehicle capable of forward flight with vertical takeoff and landing as claimed in claim 6 and including detachable service couplings.

References Cited in the file of this patent

UNITED STATES PATENTS

| | | |
|---|---|---|
| 2,424,769 | Page | July 29, 1947 |
| 2,487,646 | Gluhareff | Nov. 8, 1949 |
| 2,514,822 | Wolfe | July 11, 1950 |
| 2,818,226 | Hiller et al. | Dec. 31, 1957 |
| 2,940,688 | Bland | June 14, 1960 |
| 3,029,047 | Jacobsen et al. | Apr. 10, 1962 |

FOREIGN PATENTS

| | | |
|---|---|---|
| 574,072 | Canada | Apr. 14, 1959 |